(12) United States Patent
Vignali et al.

(10) Patent No.: US 8,603,233 B2
(45) Date of Patent: Dec. 10, 2013

(54) INKS FOR DIGITAL PRINTING ON CERAMIC MATERIALS, A PROCESS FOR DIGITAL PRINTING ON CERAMIC MATERIALS USING SAID INKS, AND CERAMIC MATERIAL OBTAINED BY MEANS OF SAID PRINTING PROCESS

(75) Inventors: Graziano Vignali, Sasso Marconi (IT); Fabrizio Guizzardi, Bologna (IT); Elisa Canto, Bologna (IT); Iuri Bernardi, Bazzano (IT); Michele Giorgi, Zola Predosa (IT)

(73) Assignee: Metco S.r.l., Monteveglio (IT)

( * ) Notice: Subject to any disclaimer, the term of this patent is extended or adjusted under 35 U.S.C. 154(b) by 609 days.

(21) Appl. No.: 12/809,094

(22) PCT Filed: Dec. 18, 2008

(86) PCT No.: PCT/EP2008/067836
§ 371 (c)(1), (2), (4) Date: Jun. 18, 2010

(87) PCT Pub. No.: WO2009/077579
PCT Pub. Date: Jun. 25, 2009

(65) Prior Publication Data
US 2010/0291362 A1  Nov. 18, 2010

(30) Foreign Application Priority Data

Dec. 19, 2007  (IT) ............................... MI2007A2385

(51) Int. Cl.
*C09D 11/02*  (2006.01)

(52) U.S. Cl.
USPC ........................................ 106/31.6; 106/31.86

(58) Field of Classification Search
USPC .............................................. 106/31.6, 31.86
See application file for complete search history.

(56) References Cited

U.S. PATENT DOCUMENTS

| | | | |
|---|---|---|---|
| 5,273,575 A | | 12/1993 | de Saint Romain |
| 5,814,434 A | * | 9/1998 | Nakamura et al. ............... 430/25 |
| 5,977,207 A | * | 11/1999 | Yui et al. ........................ 523/160 |
| 6,402,823 B1 | * | 6/2002 | Garcia Sainz et al. ..... 106/31.95 |
| 2008/0210122 A1 | * | 9/2008 | Magdassi et al. .......... 106/31.05 |

FOREIGN PATENT DOCUMENTS

| | | |
|---|---|---|
| EP | 704411 A1 | 4/1996 |
| EP | 927710 A1 | 7/1999 |
| WO | 01/51573 A1 | 7/2001 |
| WO | 2005/063650 A2 | 7/2005 |

OTHER PUBLICATIONS

Guzman, I.Y.; Chemical technology of ceramics with partial English translation; 4 pgs.

* cited by examiner

*Primary Examiner* — Kaj K Olsen
*Assistant Examiner* — Veronica F Faison
(74) *Attorney, Agent, or Firm* — Gifford, Krass, Sprinkle, Anderson & Citkowski, P.C.

(57) ABSTRACT

The present invention relates to an ink set containing chromophoric metals for digital printing on ceramic materials additive-treated with silica and titanium dioxide, a process for decorating ceramic materials by digital printing using said ink set and decorated ceramic articles obtainable by said process.

6 Claims, No Drawings

INKS FOR DIGITAL PRINTING ON CERAMIC MATERIALS, A PROCESS FOR DIGITAL PRINTING ON CERAMIC MATERIALS USING SAID INKS, AND CERAMIC MATERIAL OBTAINED BY MEANS OF SAID PRINTING PROCESS

CROSS-REFERENCE TO RELATED APPLICATIONS

This application is the U.S. national phase of PCT/EP2008/067836 filed Dec. 18, 2008, which claims priority of Italian Patent Application No. MI2007A002385 filed Dec. 19, 2007.

FIELD OF THE INVENTION

The present invention relates to an ink set containing chromophoric metals for digital printing on ceramic materials with added silica and titanium dioxide, a process for decorating ceramic materials by digital printing using said ink set, and decorated ceramic articles obtainable by said process.

PRIOR ART

For decorating ceramic materials, it has been known for some time to use liquid colouring solutions, either aqueous or based on water-immiscible organic solvents, containing chromophore ions which, when applied to the surface of ceramic materials prior to firing, develop the required colour after firing. For example, EP 704411 describes how to obtain, after firing, ceramic materials with a black colour by using aqueous solutions containing ruthenium; EP 927710 describes how to obtain rose coloured ceramic materials by applying solutions containing Au ions to the surface of the ceramic material. Particularly important for extending the range of colours available to the expert of the art has been the development of decorative processes which utilize additive-treated traditional ceramic materials which, on interaction with the liquid colouring solutions containing chromophore ions, develop, after firing, such colours as would otherwise be difficult to obtain. For example European patent EP 894081 describes how to obtain a yellow colour by applying colouring solutions containing Sb and Cr to ceramic materials containing added $TiO_2$, and European patent application EP 1713742 describes how to obtain a red colour on mixes containing added amorphous silica by using colouring solutions containing iron.

Traditional processes for applying colouring solutions to ceramic materials comprise for example: dipping, spraying, disc spraying, screen printing, rotary pad printing or rotary-recess printing. A new application technique, named "digital printing", has been recently introduced to the field of ceramic material decoration, allowing greater flexibility in producing decorations by means of using liquid colouring solutions. "Digital printing" is a generic term which identifies a printing system where the shape to be printed is generated via electronic processes and is impressed directly onto the material to be printed. Currently, the most widespread digital printing technique in the ceramic field is inkjet printing.

The use of colouring solutions containing a suspension of traditional solid ceramic pigments as inks for inkjet printing onto ceramic materials is described in "Méthodes de décoration pour l'avenir" by W. Roberts, published in the journal "L'industrie céramique" No. 827, 5/88 (pages 307-311). The advantages of using liquid colouring solutions free of suspended solids are illustrated in U.S. Pat. No. 5,273,575. More recently European patent EP 1272574 described an ink set for inkjet printing onto glazed ceramic materials, based on the CMYK colour system (Cyan-Magenta-Yellow-Black). The set for three-colour printing comprises three inks, a first ink containing a soluble cobalt complex to obtain a cyan colour, a second ink containing a soluble gold complex to obtain a magenta colour and a third ink containing at least one soluble transition metal complex (preferably soluble complexes of Sb and Cr, possibly in the presence of Ti, Mo and/or Ce complexes, applied to ceramic materials containing titanium dioxide; see example 4) to obtain a yellow colour. The set for four-colour digital printing comprises an additional ink containing a soluble ruthenium complex to obtain a black colour. The inks forming the set described in the cited patent contain particularly expensive chromophore ions, such as Au and Ru, which reduce commercial interest in the described set. Furthermore, the described inks have limited diffusive properties and are suitable solely for application onto glazed surfaces. They are therefore unsuitable for decorating materials that undergo to removal of part of the decorated surface layer, for example smoothed porcelain stoneware tiles.

TECHNICAL PROBLEM

The technical problem therefore exists of supplying a new ink set for decorating, by digital printing, materials subjected to a subsequent heat treatment, specifically for decorating ceramic materials, as an alternative to the ink sets of the known art, in which said ink set comprises liquid colouring compositions free of precious metals such as Au and Ru. Preferably the new ink set should possess diffusive characteristics such as to render it suitable for decorating both glazed ceramic materials and unglazed ceramic materials whose decorated surface is partially removed after firing.

SUMMARY OF THE INVENTION

The present invention, in a first aspect thereof, provides therefore an ink set for digital printing comprising:
  a liquid colouring composition (A) comprising a solvent and at least a cobalt compound;
  a liquid colouring composition (B) comprising a solvent and at least an iron compound;
  a liquid colouring composition (C) comprising a solvent and at least a compound of a metal chosen from chromium, nickel and mixtures thereof; and
  at least one between a liquid colouring composition (D) and a liquid colouring composition (E), wherein said liquid colouring composition (D) comprises a solvent, at least a cobalt compound and at least an iron compound, and said liquid colouring composition (E) comprises a solvent and at least a zirconium compound,
in which said metal compounds decompose by heating to temperatures between 500 and 1300° C., preferably between 940 and 1250° C., the metal compounds of compositions (A) to (D) forming the respective coloured oxides or coloured compounds derived from the interaction between the metal and the ceramic material onto which said ink set is applied, and the zirconium compounds of composition (E) forming white oxides or white compounds derived from the interaction between zirconium and the ceramic material onto which said ink set is applied.

The inventors have surprisingly discovered that to produce a sufficiently wide range of colours of interest for colouring ceramic materials, a colour system different from the CMYK (Cyan-Magenta-Yellow-Black) system can be used. Said colour system comprises the above mentioned set of at least four inks which, when applied in varying percentages to the support to be decorated by digital printing, give rise to a range of colours useful for providing a natural stone effect on ceramic materials.

The term "liquid colouring composition" means a colouring composition comprising a solute, i.e. a chromophoric metal compound, completely dissolved in at least one solvent. Therefore, the liquid colouring compositions forming the ink set of the present invention do not contain suspended solids. More specifically, the term "solvent based colouring compositions", as used in the present text, indicates liquid colouring compositions containing at least one of the water-immiscible organic solvents given below; the term "aqueous colouring compositions" indicates liquid colouring compositions in which the solvent is selected among water, at least one completely water-miscible organic solvent and mixtures thereof.

Solvents useful for the preparation of the liquid colouring compositions constituting the ink set of the present invention, are preferably chosen from:
  water;
  aliphatic hydrocarbons, among which preferred are cyclic or acyclic saturated aliphatic hydrocarbons such as pentane, hexane, heptane, octane, cyclohexane and various fractions of petroleum distillates (e.g. petroleum ether, naphtha, etc.);
  aromatic hydrocarbons, among which preferred are benzene, toluene, xylenes, terpenes and aromatic petroleum distillates;
  ethers, among which preferred are diethyl ether, tetrahydrofuran, dibutyl ether, dialkoxy ethanes (e.g. dimethoxy ethane), alkoxy ethanols (e.g. 2-methoxy ethanol) and diethylene glycol dibutyl ether;
  esters, among which preferred are ethyl acetate, isopropyl acetate, n-butyl acetate and ethyl lactate;
  ketones, such as acetone, methyl ethyl ketone, methyl isobutyl ketone and cyclohexanone;
  alcohols and glycols, among which preferred are methanol, ethanol, n-propanol, iso-propanol, n-butanol, tert-butanol, hexanol, heptanol, octanol, glycerol, ethylene glycol, diethylene glycol, propylene glycol and glycol ethers (e.g. diethylene glycol monoethyl ether);
  acids and derivatives thereof, among which e.g. acetic acid and acetonitrile;
  halogenated hydrocarbons;
  dipolar aprotic solvents, among which e.g. N-methylpyrrolidone (NMP), N,N-dimethylacetamide (DMAc), dimethyl sulphoxide (DMSO) and dimethylformamide (DMF).

The liquid colouring compositions of the present invention containing a mixture of at least two solvents are characterized in that said solvents are completely miscible. Accordingly, solvent based colouring compositions may be produced with one or more solvents chosen among hydrocarbons (both aliphatic and aromatic), halogenated hydrocarbons or ethers, or compounds of high molecular weight of the other classes named above; aqueous colouring compositions may be produced with one or more solvents chosen among water, alcohols and glycols, acids and derivatives thereof, dipolar aprotic solvents, and lower esters and ketones; it is easy for the skilled in the art to identify organic compounds that may be considered water-miscible or -immiscible, and thus choose those useful for preparing multi-solvent aqueous or solvent-based colouring compositions.

Aqueous colouring compositions are particularly preferred both for reasons of greater environmental compatibility and lower danger to human health than solvent based solutions, and because ink sets comprising aqueous colouring compositions solve the additional technical problem of diffusion into the interior of the ceramic material onto which they are applied by inkjet printing. The diffusive properties of the aqueous colouring compositions firstly enable the decoration of unglazed materials that are to be subjected to processing after the firing stage, such as smoothed or polished porcelain stoneware, and secondly to overcome the problem of dotting on the decorated surface. A particularly preferred solvent for aqueous colouring compositions is represented by a mixture of 2-35, preferably 2-25, parts by weight (b.w.) of diethylene glycol monoethyl ether, 20-98, preferably 75-98, parts b.w. of water and optionally 0-45, preferably 0-10, parts b.w. of glycerol or propylene glycol.

The metal compounds useful for the preparation of the colouring compositions (A)-(E) may be either inorganic or organic compounds.

Useful inorganic compounds may be chosen among carbonates, sulphates, nitrates and chlorides of the aforesaid metals.

DETAILED DESCRIPTION OF THE INVENTION

Preferably, in the preparation of the colouring compositions of the invention, organic compounds of said metals are employed. Preferred organic compounds are the salts and/or complexes of the aforesaid metals with an ion selected among the ascorbate ion, the acetylacetonate ion, the levulinate ion or a carboxylate ion of formula $R^1$—$COO^{(-)}$ wherein $R^1$ is selected among (i) H;

(ii) —COOH;

(iii) a radical of formula [I]:

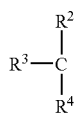

[I]

in which $R^2$, $R^3$ and $R^4$ are the same or different from each other and are independently chosen from iiia) —H;
  iiib) —$NR^5R^6$, in which $R^5$ and $R^6$, being the same or different from each other, are independently chosen among H, a linear or branched C1-C6 alkyl group possibly substituted with an —OH group, a —$(CH_2)_n$—COOH group in which n is an integer number ranging from 0 to 3, —$(CH_2)_m$—$N(H)_{2-k}$—$(CHR^7$—$COOH)_k$ group wherein m is an integer number ranging from 1 to 6, k is 1 or 2 and $R^7$ is selected among —H, —$CH_3$ and

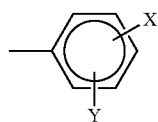

wherein X and Y are independently selected among —H, —$CH_3$, —OH and —COOH;

iiic) an aromatic radical of formula

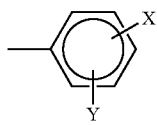

in which X and Y are the same or different and are independently chosen among H, —CH$_3$, —OH and —COOH;
(iv) a linear or branched saturated or unsaturated C1-C18 aliphatic radical possibly substituted with at least one radical chosen from —OH, —SH, —(CH$_2$)$_n$—COOR$^8$, —NH$_2$, in which n has the same meaning as given above and R$^8$ is H or a C1-C4 linear or branched alkyl group;
(v) a C4-C6 cycloaliphatic radical, possibly provided with at least one substituent chosen from:
  (va) —OH, —SH, —(CH$_2$)$_n$—COOR$^8$, —NR$^9$R$^{10}$ in which n and R$^8$ have the same meaning as described above and R$^9$ and R$^{10}$, being equal or different from each other, are independently chosen among H, a linear or branched C1-C4 alkyl radical or a —(CH$_2$)$_n$—COOH group in which n has the same meaning as given above; and/or
  (vb) a —NR$^{11}$—, —O—, —CONH— group in which R$^{11}$ is chosen among H and a group —(CH$_2$)$_n$—COOR$^8$, where n and R$^8$ have the same meaning as given above, said group being inserted into the aliphatic cycle;
(vi) an aromatic radical of formula

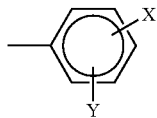

in which X and Y are the same or different and are independently chosen among H, —CH$_3$, —OH, —COOH.

Examples of useful carboxylate ions of formula R$^1$—COO$^{(-)}$ for the invention are those derived from the following carboxylic acids: formic acid, acetic acid, propionic acid, butyric acid, lactic acid, glycolic acid, oxalic acid, tartaric acid, citric acid, maleic acid, fumaric acid, citraconic acid, gluconic acid, aminoadipic acid, aminobutyric acid, aminocaproic acid, aminocaprylic acid, 2-amino-4-hydroxybutyric acid, amino-isobutyric acid, thioglycolic acid, salicylic acid, glycine, nitrile-triacetic acid, lauric acid, stearic acid, linoleic acid, linolenic acid, hexanoic acid, octanoic acid, 2-ethylhexanoic acid, decanoic acid, 2-ethyl-2,5-dimethylhexanoic acid (neodecanoic acid), benzoic acid, phthalic acid, ethylenediaminetetraacetic acid (EDTA), 1,3-propylenediaminetetraacetic acid, ethylenediamine-N,N'-bis(2-hydroxyphenylacetic) acid (EDDHA), ethylenediamine-N,N'-bis(2-hydroxy-4-methylphenylacetic) acid (EDDHMA), diethylenetriaminepentaacetic acid (DTPA) and hydroxyethylenediaminetriacetic acid (HEDTA).

The liquid colouring compositions of the invention can be prepared according to methods known to the skilled in the art, for example by solubilising commercially available metallic salts and/or complexes in a suitable solvent; or by reacting, in a suitable solvent, a source of the chromophoric metal (for example a salt or inorganic compound) with ascorbic acid, a carboxylic acid corresponding to the ions of formula [I] or acetylacetone, possibly adjusting the pH of the solution obtained with inorganic bases, e.g. sodium hydroxide, potassium hydroxide or ammonia, or organic bases, e.g. amines.

In the following description of preferred liquid compositions according to the invention, the concentration of the metal salts or complexes is expressed as a percentage by weight (wt %) of the metal relative to the total weight of the colouring composition, except where indicated otherwise.

The solvent based colouring compositions (A) preferably comprise at least one cobalt(II) complex chosen among cobalt bis(2-ethylhexanoate), cobalt octoate, cobalt 2-ethyl-2,5-dimethylhexanoate, cobalt laurate and cobalt stearate. Particularly preferred compositions (A) are the aqueous colouring compositions (A) comprising at least a cobalt complex and/or salt chosen among cobalt acetate, cobalt citrate, cobalt glycolate, cobalt EDTA and mixtures thereof. The concentration of cobalt in the liquid colouring compositions (A), either aqueous or solvent based, is preferably comprised between 0.3 and 12.0 wt %, preferably between 1.0 and 10.0 wt %. The solvent based liquid colouring compositions (A) preferably comprise 3.0-12.0 wt %, preferably 4.0-10.0 wt %, of cobalt, while the aqueous colouring compositions (A) comprise 0.3-7.0%, preferably 0.5-5.0 wt %, of cobalt. Optionally, the liquid colouring compositions (A) can comprise additional salts and/or complexes of chromophoric metals chosen among Bi, Ce, Cr, Cu, Mn, Ni, Pr, Sn, Ti, V, Zn, Zr, Al or mixtures thereof to modify the colour yield of said compositions. By heating to temperatures between 500 and 1300° C. compositions (A) decompose to produce a blue colour on the ceramic material to which they are applied by the procedure described below.

The solvent based liquid colouring compositions (B) preferably comprise at least one iron(II) and/or iron(III) salt and/or complex chosen among iron 2-ethylhexanoate, iron 2-ethyl-2,5-dimethylhexanoate, iron octoate, iron laurate and iron stearate. The aqueous colouring compositions (B) preferably comprise iron citrate, iron ammonium citrate, iron EDTA or mixtures thereof. The concentration of iron in compositions (B), either aqueous or solvent based, is preferably comprised between 0.5% and 10.0%, more preferably between 1.0% and 8.0 wt %. Optionally, said liquid colouring compositions (B) can comprise additional salts and/or complexes of chromophoric metals chosen among Co, Ni, Cr, Mn, Ti, Zn, Zr, Sb, V, Pd or mixtures thereof, preferably Ni or V, to modify the colour yield of said compositions. According to a preferred embodiment, the liquid colouring composition (B) may further contain 0.5-6.0 wt %, preferably 1.0-4.5 wt %, of zirconium. Said preferred aqueous colouring compositions (B) preferably comprise zirconium (IV) glycollate and the preferred solvent-based colouring compositions (B) preferably comprise zirconium (IV) 2-ethylhexanoate or zirconium (IV) oxy(2-ethylhexanoate). The liquid colouring compositions (B) when applied to ceramic materials additive-treated by the process described below and heated to temperatures between 500 and 1300° C. develop a reddish-brown colour.

The solvent based colouring compositions (C) preferably comprise at least one organic chromium(III) or chromium (VI) compound, preferably a chromium (III) compound, chosen among chromium 2-ethylhexanoate, chromium octoate, chromium hexanoate, chromium laurate, chromium stearate, chromium acetylacetonate, chromium 2-ethyl-2,5-dimethylhexanoate and/or at least one organic nickel (II) compound chosen among nickel 2-ethylhexanoate, nickel hexanoate, nickel 2-ethyl-2,5-dimethylhexanoate, nickel laurate and nickel stearate. The aqueous colouring compositions (C) preferably comprise at least one organic chromium compound chosen among chromium citrate, chromium ammonium citrate, chromium acetate, chromium glycolate, chromium ammonium glycolate and mixtures thereof and/or at least one organic nickel compound chosen among nickel acetate, nickel citrate, nickel ammonium citrate, nickel glycolate, nickel ammonium glycolate, nickel EDTA and mixtures thereof.

According to a first variant of the invention, the liquid colouring compositions (C) may be modified to produce compositions (C1) which comprise, in addition to said chromium and/or nickel compounds, at least a compound of a metal chosen among antimony, tungsten and mixtures thereof. Compounds useful for producing compositions (C1) are preferably chosen among salts and/or complexes of antimony (III) or tungsten (VI) with ascorbate ions, acetylacetonate ions and carboxylates of formula [I] described above. Preferably the aqueous colouring compositions (C1) comprise antimony tartrate or sodium antimony tartrate or at least a tungsten compound chosen among tungsten sodium citrate, tungsten potassium citrate, tungsten ammonium citrate and mixtures thereof.

According to a preferred variant of the invention, the liquid colouring compositions (C1) may be further modified to produce compositions (C2) which comprise, in addition to said chromium and/or nickel compounds combined with at least one antimony and/or tungsten compound, at least a titanium (IV) compound. Compounds useful for producing compositions (C2) are preferably chosen among salts and/or complexes of titanium with ascorbate ions, acetylacetonate ions and carboxylates of formula [I] described above. Solvent based colouring compositions (C2) preferably contain titanium isopropoxide or titanium 2-ethylhexanoate, while aqueous colouring compositions (C2) preferably comprise diammonium dihydroxybis[lactate(2-)-O1,O2]titanate(2-) [CAS: 65104-06-5].

Liquid colouring compositions (C) preferably contain 0.5-7.0 wt %, more preferably 0.7-5.0 wt %, of chromium, and/or 0.5-7.0 wt % of nickel. Liquid colouring compositions (C1) preferably contain 1.0-10.0 wt %, preferably 2.0-7.5 wt %, of antimony, and/or 1.0-10.0 wt % of tungsten. Liquid colouring compositions (C2) preferably contain 0.5-7.0 wt %, preferably 1.5-5.0 wt %, of titanium.

In addition to the aforesaid chromophoric metals, compositions (C) in their various embodiments can optionally comprise additional chromophoric metals in low concentrations, i.e. <0.5 wt %, such as Ce, Fe, Mo, Ni, Sn, V, Zn, Zr and mixtures thereof to modify the colour impression of the compositions. The liquid colouring compositions (C) when applied to the additive-treated ceramic materials in the procedure described below develop, by heating to a temperature between 500 and 1300° C., a pale yellow to yellow ochre colour.

The ink set of the present invention also comprises at least a further liquid colouring composition chosen between compositions (D) and (E).

Compositions (D) contain at least a cobalt (II) compound and at least an iron (II) and/or iron (III) compound. The preferred compounds in the preparation of the liquid colouring compositions (D) are the same cobalt compounds described above for preparing composition (A) and the same organic iron compounds described above for preparing colouring composition (B). Preferably, the liquid colouring compositions (D) contain 0.5-7.0 wt % of cobalt and 0.5-10.0 wt %, more preferably 1.5-7.0 wt % of iron. Further to cobalt and iron, the liquid colouring compositions (D) can optionally contain additional chromophoric metals such as Bi, Cr, Ce, Cu, Mn, Ni, Pr, Sn, Ti, V, Zn, Zr and mixtures thereof, preferably chromium, for modifying the colour impression of said colouring compositions. The colouring compositions (D) develop a brownish-grey colour after heating to a temperature between 500 and 1300° C.

Compositions (E) contain at least an organic zirconium (IV) salt and/or complex. The solvent based colouring compositions (E) preferably contain zirconium 2-ethylhexanoate. The aqueous colouring compositions (E) preferably contain a salt and/or complex of zirconium with glycolate ions. The liquid colouring compositions (E), either aqueous or solvent based, preferably have a zirconium concentration comprised between 3.0 and 15.0 wt %, more preferably between 6.0 and 12.0 wt %. When applied by means of digital printing to ceramic materials by the procedure described below, by heating at a temperature between 500 and 1300° C. the liquid colouring compositions (E) develop a white colour or decolorize coloured ceramic materials.

An ink set comprising the colouring compositions (A)-(B)-(C)-(D) is particularly suited for four colour digital printing on natural ceramic materials, i.e., onto ceramic materials obtained by mixing raw ceramic materials such as kaolin, clay and feldspar without adding colouring pigments. An ink set comprising the colouring compositions (A)-(B)-(C)-(E) is particularly useful in four colour digital printing on coloured ceramic materials, i.e., obtained from ceramic mixes of natural raw materials to which at least one colouring pigment has been added. Finally, in a third variant of the invention, the ink set comprises the colouring compositions (A)-(B)-(C)-(D)-(E) for five colour digital printing on any type of ceramic material.

The aqueous colouring compositions included in a set of inks according to the invention preferably have at least one of the following characteristics:
pH ≥5.0, more preferably between 5.0 and 10.0; and/or
surface tension <70.0 mN/m, more preferably <50.0 mN/m, even more preferably between 30.0 and 45.0 mN/m; and/or
viscosity at 32° C. between 2.0 and 15.0 mPas, more preferably between 3.5 and 8.0 mPas, in particular between 4.0 and 4.9 mPas; and/or
conductivity between 150 and 16000 µS/cm.

The solvent based colouring compositions included in a set of inks according to the invention preferably have at least one of the following characteristics:
surface tension <50.0 mN/m, more preferably between 20.0 and 40.0 mN/m; and/or
viscosity at 32° C. between 3.0 and 40.0 mPas, more preferably between 4.0 and 20.0 mPas; and/or
conductivity ≤3.0 µS/cm, more preferably equal to 0.

Other than the components listed above, the liquid colouring compositions included in the ink set of the present invention can also comprise suitable amounts of additional coadjuvant substances which modify or stabilize some physical characteristics such as ionic strength, viscosity, surface tension, visibility of application etc., in order to optimize the applicability of the ink set according to the present invention. Preferably, the liquid colouring compositions contain <1.0 wt % of markers i.e. substances that allow the printed form to be made visible.

The particularly preferred set of aqueous inks comprises:
an aqueous colouring composition (A) containing 0.5-7.0 wt %, preferably 1.0-4.5 wt %, of cobalt, comprising at least one cobalt complex and/or salt chosen from cobalt citrate, cobalt EDTA and mixtures thereof and a mixture of water and diethylene glycol monoethyl ether as solvent;
an aqueous colouring composition (B) containing 1.0-8.0 wt % of iron and optionally 0.5-3.0 wt % of zirconium, comprising iron ammonium citrate and optionally zirconium glycollate and a mixture of water and propylene glycol as solvent;

an aqueous colouring composition (C2) containing 0.5-3.0 wt %, preferably 0.7-2.0 wt %, of chromium, 2.0-7.5 wt % of antimony and optionally 1.5-5.0 wt % of titanium, comprising chromium citrate, antimony tartrate and diammonium dihydroxybis[lactate(2-)-O1,O2]titanate (2-) and a mixture of water and diethylene glycol monoethyl ether as solvent; and an aqueous colouring composition (D) containing 0.5-7.0 wt %, preferably 0.5-2.0 wt %, of cobalt, 1.0-8.0 wt %, preferably 1.0-3.0 wt %, of iron and optionally 1.0-3.0 wt % of chromium, comprising at least a cobalt complex and/or salt chosen from cobalt citrate, cobalt EDTA and mixtures thereof, at least a compound of iron chosen from iron ammonium citrate, iron EDTA and mixtures thereof and optionally at least a chromium complex chosen from chromium acetate, chromium citrate, chromium ammonium citrate and mixtures thereof and a mixture of water, propylene glycol and diethylene glycol monoethyl ether as solvent.

Another particularly preferred ink set is obtained modifying the set (A)-(D) above, by replacing composition (D) with an aqueous colouring composition (E) containing 6.5-9.5 wt % of zirconium, comprising at least one salt and/or complex of zirconium glycollate and a mixture of water and propylene glycol as solvent. The use of said preferred aqueous ink sets in the process of ceramic material decoration by digital printing described below, allows, after firing of the decorated material, a sufficiently wide colour range to be obtained such as to enable stone and natural materials to be reproduced. In particular, said ink sets have proved useful for digital printing on ceramic materials which—after firing—are subjected to machining that removes a part of the decorated surface (for example smoothing, lapping, satin polishing etc.), in that the colouring compositions diffuse into the material interior to thus colour it through to a certain depth.

The particularly preferred set of solvent-based inks comprises:
a solvent-based colouring composition (A) containing 4.0-10.0 wt %, preferably 3.0-8.0 wt %, of cobalt, comprising cobalt 2-ethylhexanoate and hydrotreated petroleum distillates as solvent;
a solvent-based colouring composition (B) containing 2.0-5.0 wt % of iron and optionally 2.0-4.0 wt % of zirconium comprising iron 2-ethylhexanoate and optionally zirconium 2-ethylhexanoate and hydrotreated petroleum distillates as solvent;
a solvent based colouring composition (C) containing 1.0-3.0 wt % of chromium comprising chromium 2-ethylhexanoate and a mixture of hydrotreated petroleum distillates and diethylene glycol dibutyl ether as solvent; and
a solvent-based colouring composition (D) containing 1.0-3.0 wt % of cobalt and 2.0-5.0 wt % of iron comprising cobalt 2-ethylhaxanoate and iron 2-ethylhexanoate and hydrotreated petroleum distillates as solvent.

The hydrotreated petroleum distillates (naphtha) used as solvent in said solvent-based ink set has preferably a flash point ranging from 90 to 150° C.

In a second aspect thereof, the present invention relates to a new process for producing decorated ceramic articles, comprising the following operating steps:
(I) providing an unfired or partially fired ceramic material comprising titanium dioxide and amorphous silica;
(II) applying by digital printing on the ceramic material derived from the previous step an ink set as described above;
(III) firing the ceramic material derived from the preceding steps to a temperature between 940 and 1300° C.

The process of the invention enables glazed or, preferably, unglazed decorated ceramic articles to be produced.

The amorphous silica useful for implementing the process of the present invention has preferably the following characteristics:
it is selected from precipitated silica, silica gel and mixtures thereof; and
it has an active surface area $S \geq 100$ $m^2/g$, wherein said active surface area is defined by the formula $S=A \times Gr$ in which Gr is the particle size fraction comprised between 5 and 60 micron, for precipitated silica, and between 1 and 60 micron for silica gel and A is the surface area of the silica in $m^2/g$ measured by the B.E.T. method. The particle size distribution of the silicas referred to is that obtained by a particle size analyzer with laser diffraction detector as stated in the ISO 13320-1 (1999) standard, provided with a wet sampler. The silica samples are normally treated prior to the analysis (for example by agitation, ultrasound treatment or surfactant addition) so as to obtain a stable dispersion of the particles in the solvent used for the test (generally water). These treatments break down the labile tertiary structures (aggregates) and the particle size measured corresponds to that of stable secondary particles (agglomerates). Further characteristics of the silicas are described in detail in patent application WO 2005/063650. The titanium dioxide useful for implementing the present invention can, without distinction, be in the form of rutile or anatase and should have a particle size distribution compatible with the particle size distribution of the constituent raw materials of the ceramic material, as known to the skilled in the art.

Step (I) can be implemented by various methods.

In a first variant of the process of the invention, in order to produce unglazed ceramic articles, silica and titanium dioxide are mixed to the other components of the ceramic mix. In this variant the ceramic material is produced by moulding, preferably by pressing, a ceramic mix, i.e. a traditional ceramic mix consisting of clays, kaolins, feldspars, etc. comprising:
0.2-15.0 wt %, preferably 0.5-7.0 wt %, of titanium dioxide and
0.3-15.0 wt %, preferably 0.5-10.0 wt %, more preferably 1.0-7.0 wt % of amorphous silica.

The percentages relate to the indicated compounds and are calculated relative to the weight of the dry ceramic mix. If the titanium dioxide and amorphous silica are added en masse to the ceramic mix, i.e. are added to the entire mix constituting the ceramic material, then the weight percentage refers to the weight of the amorphous silica and titanium dioxide relative to the weight of all the ceramic material. Alternatively, the amorphous silica and titanium dioxide can be added solely to a portion of the entire mass of the ceramic mix (double loading technique); in this case, the percentage of additives refers to the weight of the portion of dry ceramic mix to which said additives are added. Traditional ceramic raw materials already contain in their natural state a certain percentage of $TiO_2$, being generally less than 0.5 wt %; the percentages of titanium dioxide indicated above relate to the quantity of titanium dioxide deliberately added to the ceramic mix, i.e. the quantity of titanium dioxide in excess to the $TiO_2$ naturally present in the ceramic raw materials used.

The titanium dioxide and amorphous silica can be added to the ceramic mix, either simultaneously (individually and/or in a mixture) or sequentially in any order, by various alternative processes:

the additives can be mixed with the ceramic raw materials constituting the dry mix upstream the whole production cycle, i.e. prior to grinding. If this variant of the process is implemented, preferably the precipitated silica and/or the silica gel can have an initial particle size of greater than 60 micron and an active surface area less than 100 $m^2/g$; or the amorphous silica and titanium dioxide can be previously dispersed in water and added to the slip of ceramic raw materials at the mill outlet. According to this variant of the process the silicas have preferably an initial particle size comprised between 5 and 60 micron for the precipitated silica and between 1 and 60 micron for the silica gel.

This first variant of the process of the invention is particularly advantageous for the production of unglazed ceramic articles which, after firing, are to be subjected to treatment of the decorated surface, such as unglazed smoothed porcelain stoneware.

A second variant of the process for obtaining unglazed ceramic articles provides that step (I) be implemented by applying, preferably by spraying or by applying a continuous curtain of the coating medium (e.g. by Vela™ glazing system, produced by Eurotecnica S.r.l—Divisione Ingegneria Ceramica) an aqueous suspension comprising titanium dioxide and amorphous silica on all or part of the surface of the ceramic material already formed. According to a first embodiment said aqueous suspension comprises:

(a) 1.0-10.0 wt %, preferably from 3.0 to 7.0 wt %, of a solid mixture of titanium dioxide and amorphous silica; and (b) 90-99 wt %, preferably 93-97 wt %, of water.

Preferably the mixture of titanium dioxide and silica contains 85-99.5 wt %, preferably 95-99 wt %, of amorphous silica and 0.5-15 wt %, preferably 1-5 wt %, of titanium dioxide.

According to a second and particularly preferred embodiment said aqueous suspension (slurry) comprises:

(c) 40-80 wt % of a solid mixture comprising:
(c1) 0.1-1.0 wt % of titanium dioxide;
(c2) 0.5-5.0 wt % of amorphous silica; and
(c3) 99.4-94.0 wt % of a traditional ceramic mix
and
(d) 20-60 wt % of water.

The percentages of components (c1)-(c2)-(c3) are calculated relative to the total weight of the solid (dry) mixture present in the slurry. The suspensions are preferably applied in a quantity between 100 and 300 $g/m^2$, more preferably 150-250 $g/m^2$ by spraying and in a quantity between 300 and 900 $g/m^2$, more preferably 400-800 $g/m^2$ by applying a continuous curtain of suspension e.g. by Vela™ glazing system or by bell-glazing system.

This variant of the process of the invention is useful in producing unglazed ceramic articles which do not have to be subjected after firing to successive surface treatments, for example natural (unsmoothed) porcelain stoneware.

For the production of glazed ceramic articles, step (I) of the process is typically carried out by adding silica and titanium dioxide to the glaze, which is then applied onto the surface of the ceramic material to be decorated. Step (II) of the process of the invention is preferably implemented by inkjet printing.

The decorated ceramic material is then fired during step (III) at a temperature between 940 and 1300° C. The addition of titanium dioxide, precipitated silica and/or silica gel to a ceramic mix imposes a slight modification of the firing cycle of the ceramic material, in particular the maximum firing temperature. Said maximum firing temperature must be varied compared to the standard maximum firing temperature used for the same ceramic material free of additives (standard firing cycle), with the new maximum firing temperature lying within a range of ±20° C. relative to said standard maximum firing temperature. The skilled in the art, will be able to introduce the necessary modifications to the standard firing cycle for a determined ceramic material to render it suitable for firing an additive-treated ceramic material.

The fired ceramic materials derived from step (III) can be then subjected to further material surface treatments. This is the case for example for unglazed porcelain stoneware, which after firing can be abraded with diamond grinding wheels to remove various thicknesses from the surface. A smoothed porcelain stoneware is thus produced having a polished mirror-like surface or a satin surface. For the production of these unglazed ceramic articles, step (II) of the process of the invention is preferably carried out by the use of an aqueous ink set.

The process of the invention may comprise other optional steps.

In the production of unglazed ceramic articles, step (I) may be followed by a ceramic article pretreatment step (Ia). The pretreatment can be carried out by using known pretreating agents such as water or aqueous solutions of mono- or poly-carboxylic acids. Preferably said mono- or poly-carboxylic acids contain from 1 to 10 carbon atoms, with possibly from 1 to 5 hydroxy, amino or thiol substituents in the aliphatic chain, possibly partially or completely salified, with ammonium, amines and/or alkali metals and/or alkaline earth metals. Normally up to 300 $g/m^2$ of pretreatment solution are applied. Preferably the pretreatment is undertaken by disc or spray applications. The pretreatment solutions can additionally or exclusively contain halide salts, such as sodium chloride. Carrying out the optional pretreatment step (Ia) influences the diffusion of the liquid colouring compositions of the ink set of the invention into the ceramic material, and is therefore preferably undertaken for the production of unglazed ceramic articles, which, after firing, are smoothed.

The ceramic material deriving from step (II) may be post-treated (step IIa) and/or dried (step IIb). The post-treatment (IIa) is generally carried out by application of the same solutions as used in step (Ia) in a quantity comprised between 100 and 300 $g/m^2$, more preferably 150-250 $g/m^2$.

In a third aspect thereof, the present invention provides new ceramic articles decorated by digital printing, both glazed and unglazed, obtainable by the process described above. In particular, it provides unglazed smoothed ceramic articles in porcelain stoneware. Said new ceramic articles are characterized in that the decorated areas are enriched with titanium dioxide and amorphous silica.

Some non-limiting examples of embodiments of the present invention are given hereinafter. In the examples, the L*a*b* values were measured with a Dr. Lange Colorimeter, Spectrapen model (LZM224—Standard No. 1009).

EXAMPLE 1

A ceramic mix for porcelain stoneware WO3 supplied by Cooperativa Ceramica d'Imola having the weight percent oxide composition indicated below was additive-treated with 0.5 wt % of $TiO_2$ and 5.0 wt % of silica gel having a $d_{50}$=11 micron and S=260.6 $m^2/g$ (Gr=91.86%; A=283.7 $m^2/g$). The additive was added by mixing the silica and titanium dioxide with the slip. The ceramic mix was moulded into test pieces by pressing, then decorated using an aqueous ink set according to the invention by means of an HP 440 inkjet printhead (full bleed—high definition; quantity of deposited colouring composition: 20.0 g/m²). The test pieces were fired in a ceramic kiln with a 50 minute firing cycle (cold-cold) at a maximum temperature of 1215° C. The L*a*b* values were measured on the unsmoothed ceramic article.

Average Composition of WO3 Mix:
$SiO_2$ 67-68%; $Al_2O_3$ 16.8-17.4%; $Fe_2O_3$ 0.3-0.4%; $TiO_2$ (*) 0.3-0.4%; $Na_2O$ 4.5-5%; $K_2O$ 1.1-1.6%; $MgO$ 0.15-0.2%; $CaO$ 0.5-0.6%; $ZrO_2$ 4.5-5.2%; L.O.I. (loss due to firing) 2.5-3.5%.

(*) $TiO_2$ contained in the ceramic raw materials before additive treatment.

Ink Set
  colouring composition (A) comprising cobalt citrate (1.7 wt % of Co) and zinc citrate (3.0 wt % of Zn) and water as solvent;
  colouring composition (B) comprising iron EDTA (7.3 wt % of iron) and water as solvent;
  colouring composition (C2) comprising chromium (III) acetate (1.64% of Cr), antimony tartrate (1.64 wt % of Sb), diammonium dihydroxybis[lactate(2)-O1,O2]titanate(2-) (4.2 wt % of Ti) and water as solvent;
  colouring composition (D) comprising iron ammonium citrate (7.0 wt % of Fe), cobalt EDTA (3.8 wt % of Co) and water as solvent.

The colouring compositions comprising said cobalt, iron and zinc compounds were obtained by reacting an inorganic cobalt, iron or zinc salt with the respective carboxylic acid, i.e. citric acid or ethylenediaminetetraacetic acid, in the presence of water as solvent, neutralized with ammonia and mixed in suitable proportions until the colouring compositions (A)-(B)-(D) were obtained. The aqueous colouring composition (C2) was obtained by reaction between antimony oxide and tartaric acid in an aqueous environment, then neutralizing the solution obtained with sodium hydroxide and adding the indicated chromium and titanium compounds in suitable proportions. The colour rendering results of the test are reported in Table 1 below.

TABLE 1

|     | L*   | a*   | b*   | Colour description |
| --- | ---- | ---- | ---- | ------------------ |
| (A) | 70.4 | −1.5 | 2.9  | blue               |
| (B) | 66.8 | 9.4  | 16.7 | reddish brown      |
| (C) | 78.5 | 1.2  | 26.0 | yellow             |
| (D) | 54.1 | −1.2 | −0.3 | grey               |

EXAMPLE 2

An aqueous suspension comprising 3.41 wt % solid mixture, said solid mixture consisting of 98 wt % of amorphous silica and 2 wt % of titanium dioxide, was sprayed onto a standard ceramic mix for porcelain stoneware supplied by Gold Art Ceramica S.p.A. formed into 30×30 cm tiles. The tiles were then decorated using an aqueous ink set of the composition indicated below, by means of an inkjet printer. The tiles were fired in a ceramic kiln in accordance with the standard firing cycle used by Gold Art Ceramica S.p.A. The L*a*b* values were measured on the unsmoothed ceramic article.

Ink Set
  colouring composition (A) comprising cobalt citrate (0.76 wt % of Co) obtained by mixing 10 wt % of a solution of cobalt citrate containing 7.6 wt % of cobalt in water with 30.0 wt % of ethyldiglycol monoethyl ether, 14.0 wt % of glycerol and 46.0 wt % of water. The solution of cobalt citrate was obtained as described in Example 1;
  colouring composition (B) comprising iron ammonium citrate (1.4 wt % of Fe) and nickel EDTA (1.2 wt % of Ni) obtained by mixing 10.0 wt % of an iron ammonium citrate solution containing 14.0 wt % of iron in water, 15.0 wt % of a solution of nickel EDTA containing 8.0 wt % of nickel in water, 37.5 wt % of propylene glycol and 37.5 wt % of water. The solution of iron ammonium citrate was prepared as indicated in Example 1; the solution of nickel of EDTA was prepared by reacting a suitable quantity of inorganic nickel salt with ethylenediamine tetraacetic acid in water;
  colouring composition (C2) comprising chromium citrate (0.9 wt % of Cr), antimony tartrate (3.3 wt % of Sb) and diammonium dihydroxybis[lactate(2)-O1,O2]titanate(2-) (2.0 wt % of Ti) obtained by mixing 13.0 wt % of a solution of chromium citrate in water containing 6.7 wt % of chromium, 25.0 wt % of a solution of sodium antimony tartrate in water containing 13.3 wt % of antimony, 24.0 wt % of a solution of diammonium dihydroxybis[lactate(2)-O1,O2]titanate(2-) in water containing 8.2 wt % of titanium, 14.0 wt % of ethylene glycol monoethyl ether and 26.0 wt % of water. The chromium, antimony and titanium solutions were prepared as indicated in Example 1.
  colouring composition (D) comprising cobalt EDTA (2.7 wt % of Co), iron ammonium citrate (2.4 wt % of Fe) and chromium citrate (0.4 wt % of Cr) obtained by mixing 36.0 wt % of a solution of cobalt EDTA in water at 7.6 wt % of cobalt, 17.0 wt % of a solution of iron ammonium citrate in water at 14.0 wt % of iron, 6.0 wt % of a solution of chromium citrate at 6.7 wt % of chromium, 15.0 wt % of propylene glycol, 4.0 wt % of ethyldiglycol monoethyl ether and 22.0% of water. The iron, cobalt and chromium solutions were prepared as in Example 1. The colour rendering results of the test are reported in Table 2 below.

TABLE 2

|     | L*   | a*   | b*   | Colour description |
| --- | ---- | ---- | ---- | ------------------ |
| (A) | 72.1 | −2.8 | −1.0 | blue               |
| (B) | 70.4 | 6.0  | 22.2 | brown              |
| (C) | 83.2 | −0.8 | 25.0 | yellow             |
| (D) | 34.6 | 0.6  | 5.7  | black              |

EXAMPLE 3

An aqueous slurry containing:
  66.7 wt % of a solid mixture consisting of 0.25 wt % of titanium dioxide, 3.0 wt % of amorphous silica and 96.75 wt % of WO3, a ceramic mixture having the composition indicated in Example 1; and
  33.3 wt % of water
was applied by Vela™ glazing system onto an already formed 30×30 cm tile obtained by moulding META SW, a ceramic mixture supplied by Meta S.p.A. having the composition indicated below. Amount of slurry applied: 800 g/m². The amorphous silica was the same used in Example 1.

The coated tile was decorated using a solvent-based ink set according to the invention by means of a Kerajet Multijet P-140 inkjet printing operated with the following parameters: resolution 360 dpi, rank 25, speed 34 m/min.

The test pieces were fired in a ceramic kiln with a 50 minute firing cycle (cold-cold) at a maximum temperature of 1215° C. The L*a*b* values were measured on the unsmoothed ceramic article.

Average Composition of META SW:

$SiO_2$ 67-72%; $Al_2O_3$ 16-20%; $Fe_2O_3$ 0.2-0.7%; $TiO_2$(*) 0.3-0.6%; $Na_2O$ 4-5%; $K_2O$ 1-2%; MgO 0.2-0.4%; CaO 0.3-0.6%.

(*) $TiO_2$ contained in the ceramic raw materials, not intentionally added.

Ink Set:

a colouring composition (A) comprising cobalt 2-ethylhexanoate (5.5 wt % of Co) and hydrotreated petroleum distillates as solvent. The cobalt 2-ethylhexanoate was obtained by removing the mineral spirit from a 65 wt % cobalt 2-ethylhexanoate solution marketed by Sigma Aldrich. The solvent was added to the proper amount of the so obtained cobalt 2-ethylhexanoate;

a colouring composition (B) comprising iron 2-ethylhexanoate (2.58 wt % of Fe) and zirconium 2-ethylhexanoate (2.3 wt % of Zr) and hydrotreated petroleum distillates as solvent. Iron 2-ethylhexanoate was obtained by removing the mineral spirit from a 50 wt % iron 2-ethylhexanoate solution marketed by Alfa Aesar GmbH & Co KG of Karlsruhe, Germany. The zirconium 2-ethylhexanoate was obtained by reacting basic zirconium carbonate with 2-ethylhexanoic acid (molar ratio Zr:acid=1:2) for 8 h at 100° C. distilling the water formed in the reaction. The composition was obtained adding the solvent to the proper amount of the so obtained iron and zirconium 2-ethylhexanoates;

a colouring composition (C) comprising chromium 2-ethylhexanoate (2.0 wt % of Cr) and a mixture of 92 wt % of hydrotreated petroleum distillates and 8 wt % of diethylene glycol dibutyl ether as solvent. The chromium 2-ethylhexanoate was obtained by reacting chromium triacetate with 2-hethylhexanoic acid (molar ratio Cr:acid=1:3) under vacuum for 6 h eliminating by distillation the acetic acid formed in the course of the reaction. The composition was obtained by adding the solvent mixture to the proper amount of the so obtained chromium 2-ethylhexanoate;

a colouring composition (D) comprising iron 2-ethylhexanoate (2.88 wt % of Fe), cobalt 2-ethylhexanoate (1.21 wt % of Co) and hydrotreated petroleum distillates as solvent. The iron 2-ethylhexanoate was obtained as described for composition (B) and the cobalt 2-ethylhexanoate was obtained as described for composition (A).

The colour rendering results of the test are reported in Table 3 below.

TABLE 3

|   | L* | a* | b* |
|---|---|---|---|
| (A) | 71.8 | -2.8 | -7.0 |
| (B) | 77.8 | 7.1 | 17.7 |
| (C) | 78.9 | 1.4 | 20.2 |
| (D) | 68.8 | 2.0 | 6.7 |

EXAMPLE 4

A solvent-based ink set having the composition indicated below was applied by means of a Kerajet Multijet P-140 inkjet printing operated with the following parameters: resolution 360 dpi, rank 29, speed 34 m/min onto a 30×30 tile obtained by pressing META SW, a ceramic mixture supplied by Meta Spa having the composition indicated in Example 3.

Prior to decoration, the green tile was coated with a slurry as described in Example 3.

The decorated tile was fired in a ceramic kiln with a 50 minute firing cycle (cold-cold) at a maximum temperature of 1215° C. and subsequently polished with a brushing machine to obtain matt surface. The L*a*b* values were measured on the polished ceramic article.

Ink Set:

a colouring composition (A) comprising cobalt 2-ethylhexanoate (6.0 wt % of Co) and Exxol D120 as solvent. The cobalt 2-ethylhexanoate was obtained as described for composition (A) of Example 3;

a colouring composition (B) comprising iron 2-ethylhexanoate (2.7 wt % of Fe) and zirconium 2-ethylhexanoate (2.3 wt % of Zr) and hydrotreated petroleum distillates as solvent. The composition was obtained as composition (B) of Example 3;

a colouring composition (C) comprising chromium 2-ethylhexanoate (1.76 wt % of Cr), Titanium 2-ethylhexanoate (2.9 wt % of Ti) and a mixture of 82.5 wt % of diethylene glycol dibutyl ether and 17.5 wt % of hydrotreated petroleum distillates as solvent. The chromium 2-ethylhexanoate was obtained as described in Example 3. The titanium 2-ethylhexanoate was obtained by reacting titanium isopropoxide with 2-ethylhexanoic acid;

a colouring composition (D) comprising iron 2-ethylhexanoate (2.88 wt % of Fe), cobalt 2-ethylhexanoate (1.32 wt % of Co) and hydrotreated petroleum distillates as solvent. The composition was obtained as composition (D) of Example 3.

The colour rendering results of the test are reported in Table 4 below.

TABLE 4

|   | L* | a* | b* |
|---|---|---|---|
| (A) | 66.6 | -2.3 | -8.8 |
| (B) | 73.0 | 7.6 | 17.4 |
| (C) | 77.2 | 1.1 | 22.3 |
| (D) | 65.9 | 2.4 | 8.3 |

The invention claimed is:

1. An ink set for digital printing comprising:

a liquid colouring composition (A) selected between i) a composition consisting of a solvent and one or more cobalt compounds, and ii) a composition consisting of a solvent, one or more cobalt compounds and one or more salts and/or complexes of chromophoric metals chosen among Bi, Ce, Cr, Cu, Mn, Ni, Pr, Sn, Ti, V, Zn, Zr, Al;

a liquid colouring composition (B) selected between i) a composition consisting of a solvent and one or more iron compounds, and ii) a composition consisting of a solvent, one or more iron compounds and one or more salts and/or complexes of chromophoric metals chosen among Co, Ni, Cr, Mn, Ti, Zn, Zr, Sb, V, Pd;

a liquid colouring composition (C) selected between i) a composition consisting of a solvent and one or more compounds of chromium, one or more compounds of nickel and mixtures thereof, and ii) a composition consisting of a solvent, one or more compounds of chromium, one or more compounds of nickel, and at least a compound of a metal chosen among Sb, W, Ti, Ce, Fe, Mo, Ni, Sn, V, Zn, Zr and mixtures thereof; and at least one between a liquid colouring composition (D) and a liquid colouring composition (E), wherein said liquid colouring composition (D) is selected between i) a composition consisting of a solvent, one or more cobalt compounds and one or more iron compounds, and ii) a composition consisting of a solvent, one or more cobalt compounds, one or more iron compounds and one or more chromophoric metals chosen among Bi, Cr, Ce, Cu, Mn, Ni, Pr, Sn, Ti, V, Zn, Zr, and said liquid colouring composition (E) comprises a solvent and one or more zirconium compounds,
in which said metal compounds decompose by heating to temperatures between 500 and 1300° C. the metal compounds of compositions (A) to (D) forming the respective coloured oxides or coloured compounds derived from the interaction between the metal and the ceramic material onto which said ink set is applied, and the zirconium compounds of composition (E) forming white oxides or white compounds derived from the interaction between zirconium and the ceramic material onto which said ink set is applied.

2. An ink set according to claim 1, wherein said solvent is chosen among water, at least one completely water-miscible organic solvent, or mixtures thereof.

3. An ink set according to claim 1, wherein said solvent is chosen among one or more water-immiscible organic solvents.

4. An ink set according to claim 1, wherein said metal compounds are selected among salts and/or complexes of metals with the ascorbate ion, the acetylacetonate ion, the levulinate ion or a carboxylate ion of formula:

wherein $R^1$ is selected among
(i) H;
(ii) —COOH;
(iii) a radical of formula [I]:

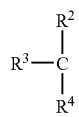

[I]

in which $R^2$, $R^3$ and $R^4$ are the same or different from each other and are independently chosen from
iiia) —H;
iiib) —NR$^5$R$^6$, in which $R^5$ and $R^6$, being the same or different from each other, are independently chosen among H, a linear or branched C1-C6 alkyl group possibly substituted with an —OH group, a —(CH$_2$)$_n$—COOH group in which n is an integer number ranging from 0 to 3, —(CH$_2$)$_m$—N(H)$_{2-k}$—(CHR$^7$—COOH)$_k$ group wherein m is an integer number ranging from 1 to 6, k is 1 or 2 and $R^7$ is selected among —H, —CH$_3$ and

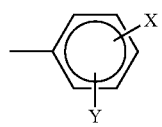

wherein X and Y are independently selected among —H, —CH$_3$, —OH and —COOH;

iiic) an aromatic radical of formula

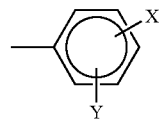

in which X and Y are the same or different and are independently chosen among H, —CH$_3$, —OH and —COOH;
(iv) a linear or branched saturated or unsaturated C1-C18 aliphatic radical possibly substituted with at least one radical chosen from —OH, —SH, —(CH$_2$)$_n$—COOR$^8$, —NH$_2$, in which n has the same meaning as given above and $R^8$ is H or a C1-C4 linear or branched alkyl group;
(v) a C4-C6 cycloaliphatic radical, possibly provided with at least one substituent chosen from
(va) —OH, —SH, —(CH$_2$), —COOR$^8$, —NR$^9$R$^{10}$ in which n and $R^8$ have the same meaning as described above and $R^9$ and $R^{10}$, being equal or different from each other, are independently chosen among H, a linear or branched C1-C4 alkyl radical or a —(CH$_2$)$_n$—COOH group in which n has the same meaning as given above;
and/or
(vb) a —NR$^{11}$—, —O—, —CONH— group in which $R^{11}$ is chosen among H and a —(CH$_2$)$_n$—COOR$^8$, where n and $R^8$ have the same meaning as given above, said group being inserted into the aliphatic cycle;
(vi) an aromatic radical of formula

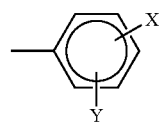

in which X and Y are the same or different and are independently chosen among H, —CH$_3$, —OH, —COOH.

5. An ink set according to claim 1, comprising:
an aqueous colouring composition (A) containing 0.5-7.0 wt % of cobalt, comprising at least one cobalt complex and/or salt chosen from cobalt citrate, cobalt EDTA and mixtures thereof and a mixture of water and diethylene glycol monoethyl ether as solvent;
an aqueous colouring composition (B) containing 1.0-8.0 wt % of iron and optionally 0.5-3.0 wt % of zirconium comprising iron ammonium citrate and optionally zirconium glycollate and a mixture of water and propylene glycol as solvent;
an aqueous colouring composition (C2) containing 0.5-3.0 wt % of chromium, 2.0-7.5 wt % of antimony and optionally 1.5-5.0 wt % of titanium, comprising chromium citrate, antimony tartrate and diammonium dihydroxybis[lactate(2-)-O1,O2]titanate(2-) and a mixture of water and diethylene glycol monoethyl ether as solvent; and
an aqueous colouring composition (D) containing 0.5-7.0 wt % of cobalt, 1.0-8.0 wt % of iron and optionally 1.0-3.0 wt % of chromium, comprising at least a cobalt complex and/or salt chosen from cobalt citrate, cobalt EDTA and mixtures thereof, at least a compound of iron chosen from iron ammonium citrate, iron EDTA and mixtures thereof and optionally at least a chromium complex chosen from chromium acetate, chromium citrate, chromium ammonium citrate and mixtures thereof, and a mixture of water, propylene glycol and diethylene glycol monoethyl ether as solvent.

6. An ink set according to claim 1 comprising:

a solvent-based colouring composition (A) containing 4.0-10.0 wt % of cobalt, comprising cobalt 2-ethylhexanoate and hydrotreated petroleum distillates as solvent;

a solvent-based colouring composition (B) containing 2.0-5.0 wt % of iron and optionally 2.0-4.0 wt % of zirconium comprising iron 2-ethylhexanoate and optionally zirconium 2-ethylhexanoate and hydrotreated petroleum distillates as solvent;

a solvent based colouring composition (C) containing 1.0-3.0 wt % of chromium comprising chromium 2-ethylhexanoate and a mixture of hydrotreated petroleum distillates and diethylene glycol dibutyl ether as solvent; and a solvent-based colouring composition (D) containing 1.0-3.0 wt % of cobalt and 2.0-5.0 wt % of iron comprising cobalt 2-ethylhaxanoate and iron 2-ethylhexanoate and hydrotreated petroleum distillates as solvent.

* * * * *

UNITED STATES PATENT AND TRADEMARK OFFICE
CERTIFICATE OF CORRECTION

PATENT NO. : 8,603,233 B2  
APPLICATION NO. : 12/809094  
DATED : December 10, 2013  
INVENTOR(S) : Graziano Vignali et al.

It is certified that error appears in the above-identified patent and that said Letters Patent is hereby corrected as shown below:

In the Claims:

At column 18, claim number 4, line number 20, Delete "$(CH_2)$,", Insert --$(CH_2)_n$--

Signed and Sealed this  
Twelfth Day of May, 2015

Michelle K. Lee  
*Director of the United States Patent and Trademark Office*